United States Patent

[11] 3,587,758

| [72] | Inventors | Tomohiko Akuta; |
| | | Atsumi Seya, Kitakyushu, Japan |
| [21] | Appl. No. | 763,075 |
| [22] | Filed | Sept. 27, 1968 |
| [45] | Patented | June 28, 1971 |
| [73] | Assignees | Yawata Iron & Steel Co., Ltd.; |
| | | Mitsubishi Seiko Kabushiki Kaisha |
| | | Tokyo, Japan |

[54] METHOD AND APPARATUS FOR MEASURING A RELATIVELY SMALL LOAD VARIATION
5 Claims, 5 Drawing Figs.

| [52] | U.S. Cl. | 177/1, 177/170 |
| [51] | Int. Cl. | G01g 23/14 |
| [50] | Field of Search | 177/168–170, 188, 230, 231, 1 |

[56] References Cited
UNITED STATES PATENTS

| 2,993,547 | 7/1961 | Richardson | 177/168 |
| 3,163,248 | 12/1964 | Farquhar | 177/188X |
| 3,373,830 | 3/1968 | Thomson | 177/168 |

FOREIGN PATENTS

| 758,039 | 9/1956 | Great Britain | 177/231 |

Primary Examiner—Richard B. Wilkinson
Assistant Examiner—George H. Miller, Jr.
Attorneys—Robert E. Burns and Emmanuel J. Lobato ABSTRACT: To measure small variations in a load an initial load is applied to a lever at one end and at the other end a balancing spring and a load cell are arranged on the opposite sides of the lever. The spring coefficient of the balancing spring is much greater than that of the load cell. The load-variation component subtracted from or added to the initial load is measured by the load cell with its full scale upon subtracting or adding the initial load component. A bracket may be used instead of the lever.

METHOD AND APPARATUS FOR MEASURING A RELATIVELY SMALL LOAD VARIATION

BACKGROUND OF THE INVENTION

In measuring the weight of molten steel in a ladle by a crane scale, conventionally, the total weight of the molten steel including such tares as the ladle itself and its hanging beam is measured, and then the weight of such tares is subtracted from the total weight whereby the weight of the molten steel is obtained. Since the accuracy of such weight-measuring method is usually nor more than about 0.2 percent, that is, an error of ±400 kg. for a total weight of 200 tons, such a method is satisfactory for measuring the total weight of the steel output but difficult to use for control of the unit-by-unit weight of the melt, e.g. pouring steel into an ingot in an ingot-making operation.

SUMMARY OF THE INVENTION

This invention relates to a method for measuring a load-variation component subtracted from or added to a certain initial load, and more particularly to a load-variation-measuring method for molten steel in a ladle for ingot making in steel mills.

In accordance with the invention, in the case of measuring a load-variation component subtracted from or added to a certain initial load, a load-measuring element or a displacement-measuring element which is made to indicate the load-variation component with nearly its full scale at a state of equilibrium with the initial load balanced by a balancing spring or a balance weight is arranged so as to arrest the operation of the load-variation component and the load-variation component is measured by measuring the unbalanced force or the displacement due to said load-variation component alone by said element. That is, the present method is characterized in that in measuring, the total load including tares such as a ladle, a hanging beam etc., is first balanced by the balancing spring or the balancing weight, and then an unbalanced load due merely to the load variation component (e.g. the weight of an ingot, say 20 tons) is measured alone.

In consequence, the present invention provides a method for measuring a weight have accuracy as, for instance, ±40 kg. per a weight-variation component (in the present particular case, 20 tons) though the relative accuracy is as same as that in the conventional method.

It is a main object of the present invention to provide an improved method for measuring a load-variation component subtracted from or added to a certain initial load.

The present invention is applicable not only to a single weight control of an ingot in steel-making operation but also widely to other fields in which an accurate measurement of a small load-variation component comparing to its tare is required.

BRIEF DESCRIPTION OF THE DRAWINGS

The above and other objects, features and advantages of the invention will be more readily understood from the following detailed description in conjunction with the accompanying drawings, in which.

DESCRIPTION OF THE PREFERRED EMBODIMENTS

Figure 1:
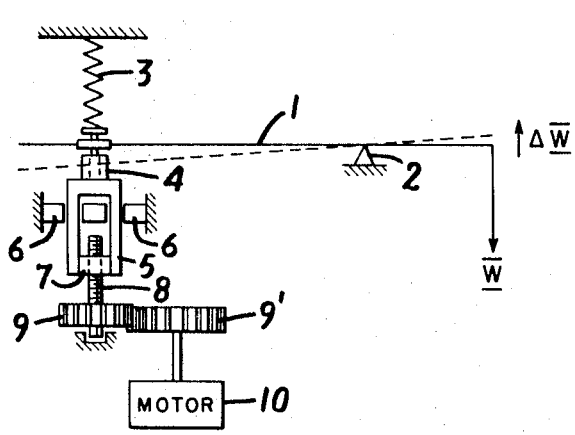
FIG. 1 is a diagram of a system for carrying out the method according to the present invention.

Referring to FIG. 1, there is shown diagrammatically one of the preferred systems for carrying out the method according to the present invention.

A lever 1, supported by a fulcrum 2 on a hanging beam of a crane, is in a state of equilibrium with one of its ends loaded by a total weight W, such as a ladle containing molten steel, and its other end loaded by a balancing spring 3 as shown by the solid line in FIG. 1. In case the lever 1 does not assume a horizontal state, it may be maintained in a horizontal state by a method to be described, thus obtaining a more accurate reading.

In the above condition, a load cell 4 is arranged below the lever 1 at the opposite side of the balancing spring 3 so that it presses the balancing spring 3 upward and it is pressed against the balancing spring 3 through the lever 1 so that the load cell 4 indicates a very small indicating value "Co."

One way to press said load cell 4 against the balancing spring 3 is to set the load cell 4 in a guide bar 5 guided by a guide frame 6,6 and to move the guide bar 5 by a nut 7 secured to the guide bar 5 at its lower end. The nut 7 in turn engages a screw-threaded rod 8 having a gear 9 at its lower end, which gear 9 meshes with a gear 9' connected to a reversible motor 10.

Thus, upon rotation of the motor 10, the load cell 4 is moved upward or downward through the gears 9,9', the screw-threaded rod 8, the nut 7 and the guide bar 5 depending on the direction of rotation of the motor 10.

As stated above, when the balancing spring 3 is in equilibrium with the total weight W, the load cell 4 is pressed against the lever 1 with a small output "Co".

Assuming that molten steel weighing $\Delta W$ corresponding to the weight of one ingot is poured out from the ladle, then if there existed only the spring 3 and not the cell 4 due to the change of the load of $\Delta W$ the lever 1 would begin to assume a new equilibrium state as shown by the dotted line in FIG. 1. However, in the present case the lever 1 is subject to the action of the load cell 4 in addition to the balancing spring 3. Therefore, if the load cell 4 is selected to have a very large spring coefficient, the lever 1 remains close to a position shown by the solid line in FIG. 1, neglecting the deflection of lever 1.

Accordingly, nearly all of the load $\Delta W$ is applied to load cell 4.

Figure 5:
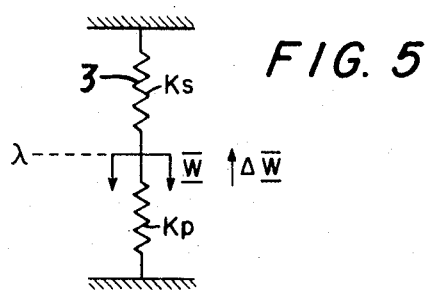
FIG. 5 is a diagram showing the operational principle of the system shown in FIG. 1.

In other words, between $\Delta W$ and the deflection of load cell 4 there exists a relation as shown in FIG. 5.

This relation is expressed by the following equation:

$$\Delta W = \lambda(Kp + Ks) \quad (1)$$

Wherein:

$\Delta W$: variable load in kg.;

$\lambda$ : deflection (elongation or contraction) of the load cell in cm.;

$Kp$: $Ks$: spring coefficients of the load cell and the balancing spring respectively in kg./cm.

In the above relations, considering that the spring coefficient of the load cell is much larger than that of the balancing spring, assume the ratio $Kp/Ks$ to be equal to 100.

Then the load-carrying ratio, $m$, of the load cell to the change in weight W becomes $$m = \frac{\lambda Kp}{\Delta W} = \frac{\lambda Kp}{\lambda(Kp+Ks)} = \frac{100}{101} = 0.990$$

This means that the load cell 4 carries nearly all of the load $\Delta W$.

The deflection ratio $n$ which is defined as the ratio of the deflection due to the load $\Delta W$ when the load cell 4 and the balancing spring 3 are used to the deflection due to the same load $\Delta W$ when the balancing spring 3 alone is used is expressed as given below by assuming that $Kp/Ks = 100$:

$$n = \frac{\frac{1}{Kp+Ks}}{\frac{1}{KS}} = \frac{Ks}{Kp+Ks} = \frac{1}{101} = 0.01$$

This shows that in the above condition, owing to the setting of the load cell 4, the deflection is reduced to one one-hundredth of the deflection when the balancing spring 3 alone is used.

In the above example, the load cell 4 carries 99 percent of the load since this ratio of 99 percent is always constant, even though the load carrying ratio is not 100 percent, there arises no error in the weight measurement.

In this case, when the indicated value of the load cell is $C_1$ the following relation is derived:

$$\Delta W = C_1 - C_0$$

In practice, it is usual to express the output of the load cell 4 by an electrical value such as voltage. By adjusting the indication of the indicating meter to zero when the initial output is $C_0$, the indicated value automatically gives $\Delta W$ without special calculations.

In FIG. 1, after having measured $\Delta W$ and finished the pouring operation of one ingot, the load cell 4 is separated from the lever 1 through the gears 9,9', the screw thread rod 8, the nut 7, and the guide bar 5 by reversing the motor 10, the lever 1 comes down to the position shown by the dotted line in FIG. 1 and the balancing spring 3 is in equilibrium with the load $(W-\Delta W)$.

When pouring for the next ingot, the load cell 4 is pushed upward to the position of the lever 1 as shown by the dotted line in FIG. 1 by the driving motor 10 so that again the load cell 4 presses lightly against the lever 1, and a similar measurement is effected by repeating the procedure stated above.

Accordingly, as load cell 4 has only to measure the weight of one ingot, $\Delta W$, with its full scale, the accuracy of the measurement is much greater than with the conventional methods in which the total weight is measured by a full scale. Further, by using a load cell which has as large a rigidity as the load cell 4, the balancing spring 3 can be made almost not to deflect in measuring $\Delta W$, so that the accuracy of measuring $\Delta W$ is not affected even when the balancing spring 3 has a poor load-deflection (i.e. nonlinear) characteristic.

Namely, when $\Delta W$ is calculated from the measurement of the deflection $\lambda$ in equation (1), since Kp, Ks have no constant value with respect to $\lambda$ there arises an error due to nonlinearity.

When the equation (1) is modified by taking into consideration the nonlinearity of Kp, Ks, it yields the following equation:

$$\Delta W = (Kp + Ks)\left(1 + \frac{\delta Kp + \delta Ks}{\overline{Kp} + \overline{Ks}}\right) \quad (2)$$

wherein:

$\Delta W$: variable load in kg;

$\lambda$: deflection of the load cell due to W in cm. (e.g. an elongation or a contraction of the load cell, equaling to that of the balancing spring);

$\overline{Kp}, \overline{Ks}$: mean spring coefficients of the load cell and the balancing spring respectively within their ranges of normal use in kg./cm.;

$\delta Kp, \delta Ks$: deviations of Kp and Ks from $\overline{Kp}$ and $\overline{Ks}$ respectively.

The term "a spring has a poor linearity" means that the value of $\delta Ks$ is large.

We will show below that $\Delta W$ is not affected by a somewhat large $\delta Ks$ so long as $\overline{Kp}$ is selected to have a proper value.

In this consideration, the following assumptions are made:

$$\overline{Kp}/\overline{Ks} = 100$$

and $$\delta Ks = 0.05 \ \overline{Ks} \ (5 \ \text{percent})$$

And also that $\delta Kp$ is nearly equal to zero on the assumption that a load cell is carefully designed, made and used.

In this case, the error term of the equation (2), e.g., the last term of the right side becomes the following:

$$1 + \left(\frac{\delta Kp + \delta Ks}{\overline{Kp} + \overline{Ks}}\right) = 1 + \frac{0 + 0.05\overline{Ks}}{100\overline{Ks} + \overline{Ks}} = 1.0005$$

This shows that even if $\delta Ks$ has a nonlinearity of 5 percent $\Delta W$ is affected only by five ten-thousandths.

Thus by selecting $\overline{Kp}$ so as to be much larger than $\overline{Ks}$, the measurement of $\Delta W$ is isolated from the nonlinearity of the balancing spring to a large extent.

Though the principle of the present method was explained above, for the case where a balancing spring 3 is used to balance the load, it may be equally applied in the case where a balance weight is used to balance with the load.

Figure 2:
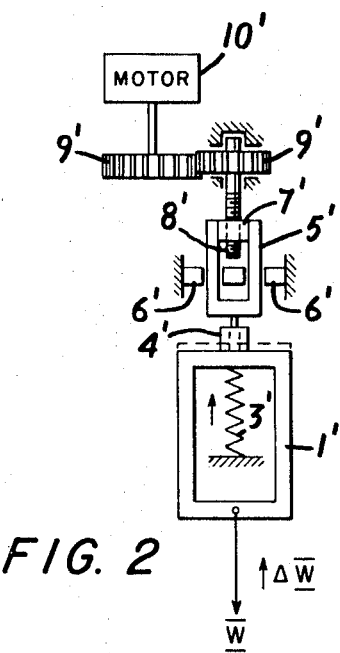
FIG. 2 is a diagram of another system for carrying out the method according to the present invention.

The present method may also be applied to a case where a lever system is not used (see FIG. 2).

In the system shown in FIG. 1, when $\Delta W$ is removed a force proportional to $\Delta W$ is applied to the load cell 4 through the fulcrum 2 and the lever 1, while in FIG. 2, $\Delta W$ is applied directly to a load cell 4' through a hanging frame 1'. This system has an advantage in that $\Delta W$ is measured without including errors due to the lever system.

The operation for pressing the load cell 4' against the hanging frame 1' is similar to that of the system shown in FIG. 1.

Figure 3:
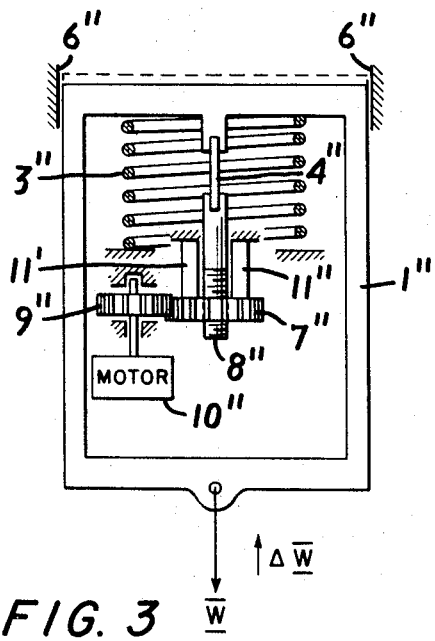
FIG. 3 is a diagram of a modification of the system shown in FIG. 2.

FIG. 3 shows an example intended for experimental use. The measuring principle of the system shown in FIG. 3 is another application of the principles of the systems shown in FIGS. 1 and 2.

In the system shown in FIG. 2, when a load of $\Delta W$ is removed, a balance spring 3' pushes upward and consequently the load cell 4' which is set so as to oppose such force is subject to a compressive force. In FIG. 3, on the contrary, a load cell 4'' acts so as to prevent the balancing spring 3'' from expansion with the creation of a tensile stress in the load cell 4'' upon removal of $\Delta W$. The advantage of the embodiment of FIG. 3 is that the load cell 4'' has greater stability without buckling notwithstanding that it has a small cross-sectional area.

On the contrary, when a load cell is used in compression, the output is limited because of its low buckling resistance.

The system shown in FIG. 3 will now be explained in detail. The spring 3' and the load W supported by a hanging frame 1'' are in an equilibrium state as shown by the solid line in FIG. 3.

In order to prevent the load cell 4'' from moving upward due to the elongation of the spring 3'' when load $\Delta W$ is removed from load W, the load cell 4'' is pulled downward by a guide rod 8'' which has threads engaging with a nut 7'' having teeth in its outer periphery, which in turn meshes a gear 9'' drivingly connected to a motor 10'', whereby the nut 7'' is guided by the guides 11' so that it can only move upward or downward. As a consequence the load cell 4'' produces small output $C'_0$.

In this case, assuming that $\Delta W$ is removed from W and the spring coefficient of the load cell 4'' is much larger than that of the balancing spring 3'', for the same reason as for the system shown in FIG. 1, then load $\Delta W$ in the load cell 4'' can be obtained as follows when the output of the load cell 4'' is $C''_1$:

$$\Delta W = C''_1 - C''_0$$

Since the principle of the system of FIG. 3 is identical to the principle shown in FIG. 5, the error is the same as that in the system shown in FIG. 1.

Figure 4:
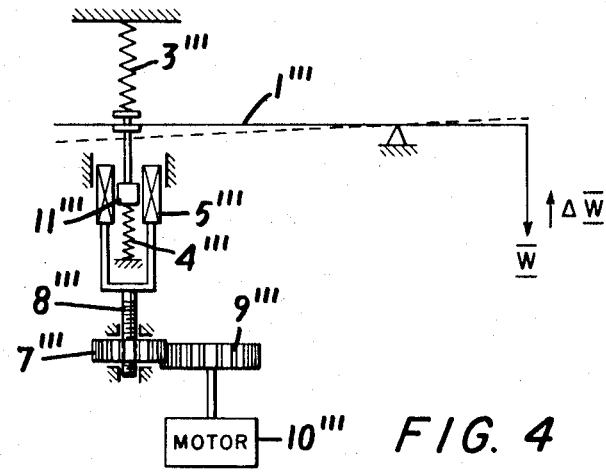
FIG. 4 is a diagram of a modification of the system shown in FIG. 1.

Though the principle of the system shown in FIG. 3 as explained is for measuring an unbalance due to a variable load with a load cell having very large spring coefficient compared with a balancing spring, $\Delta W$ may also be measured by a system shown in FIG. 4. A differential transformer 5''' is used in place of the load cell and accurately measures a deflection of a balancing spring 3''' due to the load variation component $\Delta W$ by the differential transformer 5''', whereby a ferrous core 11''' of the differential transformer 5''' is pressed against a lever 1''' by a spring 4''' having such a small spring coefficient that it can be almost neglected compared with that of balancing spring 3'''.

The principle of this method is shown in FIG. 4 for a lever system, and the lever is in a position shown by the solid line in FIG. 4 if the lever system is assumed to be in equilibrium with load W.

In this instance, by revolving a nut 7''' having teeth on its outer periphery with a motor 10''' through a gear 9''' which meshes with the teeth of a nut 7''', a connecting rod 8''' coupled to the coil of the differential transformer 5''' is moved upward or downward, and the rod 8''' is stopped at a place where a small output $C'''_0$ is produced from differential transformer 5'''.

In this state, when the load $\Delta W$ is removed, the lever 1''' moves to a position shown in the dotted line in FIG. 4, accordingly the core 11'''' of the differential transformer 5''' moves proportionally to the movement of the lever. When the output of the differential transformer 5''' is $C'''$, $\Delta W$ is obtained by $\Delta W = C'''_1 - C'A:_0$.

It is natural to use the differential transformer 5''' which indicates in full scale the deflection of the balancing spring due to load $\Delta W$.

According to the method shown in FIG. 4, since the power to drive the parts for moving the differential transformer 5''' upward or downward is small, the method has an advantage that it is of light construction compared with an apparatus using a load cell. However, since the load-deflection characteristic (linearity) of the balancing spring directly affects the accuracy of the measurement it is necessary to use a precision spring. But, as a spring which has a full scale nearly equal to $\Delta W$ of the differential transformer is used, errors due to the nonlinearity of a differential transformer can be made small.

The above description is intended as illustrative only and not limiting the scope of the invention being defined by the following claims.

I claim:

1. Apparatus for accurately measuring incremental decreases in weight of a full load, comprising: means for supporting said load including a balancing device having a spring constant; a measuring device having a spring constant, the spring constant of said measuring device being much greater than that of said balancing device; means for positioning said measuring device lightly against said supporting means in parallel with said balancing device thereby permitting a full measuring indication on said measuring device when said load is decreased an incremental amount.

2. An apparatus as in claim 1, wherein said supporting means comprises a fulcrum and a lever pivoted about said fulcrum, and wherein said full load is connected to one end of said lever, and said balancing device and measuring device are connected to the other end of said lever.

3. An apparatus as in claim 1, wherein said means for positioning said measuring device comprises screw means for moving said measuring device and a reversible motor for driving said screw means.

4. Apparatus for accurately measuring incremental decreases in weight of a full load, comprising: means for supporting said load including a balancing device having a spring constant; a measuring device having a spring constant, the spring constant of said measuring device being much greater than that of said balancing device; means for positioning said measuring device lightly against said supporting means in opposition to the force of said balancing device, wherein said balancing device and said measuring device act on said supporting means in opposition to one another, thereby permitting a full measuring indication on said measuring device when said load is decreased an increment amount.

5. A method for accurately measuring incremental decreases in weight of an initial load, comprising supporting said load on a movable support, balancing said load with a balancing device having a first spring constant and lightly engaging said support with a measuring device having a second spring constant much higher than said first spring constant, decreasing the load in incremental amounts, and, after each said decrease in load, measuring the amount of said decrease and adjusting the position of said measuring device to again lightly engage said support.